US008713561B2

(12) United States Patent
Hirokawa

(10) Patent No.: US 8,713,561 B2
(45) Date of Patent: Apr. 29, 2014

(54) DEVICE, INFORMATION PROCESSING METHOD, AND COMPUTER-READABLE STORAGE MEDIUM

(75) Inventor: Tomoya Hirokawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 106 days.

(21) Appl. No.: 13/563,934

(22) Filed: Aug. 1, 2012

(65) Prior Publication Data

US 2013/0042232 A1 Feb. 14, 2013

(30) Foreign Application Priority Data

Aug. 8, 2011 (JP) .................................. 2011-172699

(51) Int. Cl.
  *G06F 9/445* (2006.01)
(52) U.S. Cl.
  USPC ........... 717/174; 717/169; 717/170; 717/172; 717/173
(58) Field of Classification Search
  None
  See application file for complete search history.

(56) References Cited

U.S. PATENT DOCUMENTS

| 8,488,135 | B2 * | 7/2013 | Shimizu et al. ............. 358/1.13 |
| 2005/0226641 | A1 * | 10/2005 | Ando et al. ....................... 399/8 |
| 2007/0008583 | A1 * | 1/2007 | Araki ........................... 358/1.15 |
| 2007/0064892 | A1 * | 3/2007 | Ando ....................... 379/114.28 |
| 2007/0124510 | A1 * | 5/2007 | Ando ............................... 710/8 |
| 2008/0059960 | A1 * | 3/2008 | Akiyoshi ...................... 717/170 |
| 2010/0231945 | A1 * | 9/2010 | Tanaka ......................... 358/1.13 |
| 2010/0333068 | A1 * | 12/2010 | Niimura et al. .............. 717/125 |
| 2012/0297397 | A1 * | 11/2012 | Araki ........................... 718/107 |
| 2013/0036420 | A1 * | 2/2013 | Ohishi ......................... 718/100 |
| 2013/0174141 | A1 * | 7/2013 | Hirokawa et al. ............ 717/174 |

FOREIGN PATENT DOCUMENTS

| JP | 2004-118237 | 4/2004 |
| JP | 2005-269619 | 9/2005 |
| JP | 2006-271005 | 10/2006 |
| JP | 2006-311590 | 11/2006 |
| JP | 2007-048270 | 2/2007 |
| JP | 2007-049677 | 2/2007 |
| JP | 2007-109218 | 4/2007 |
| JP | 2007-109219 | 4/2007 |

* cited by examiner

*Primary Examiner* — Isaac Tecklu
(74) *Attorney, Agent, or Firm* — IPUSA, PLLC

(57) ABSTRACT

A device may include a first manager to store attribute information of a first program in a first storage in response to an install request to install the first program, and a second manager to store attribute information of a second program in a second storage in response to an install request to install the second program. The second manager may store attribute information of a third program and attribute information of the second program included in the third program in the second storage, and store attribute information of the first program included in the third program in the first storage, in response to an install request to install the third program that includes the first program and the second program.

14 Claims, 15 Drawing Sheets

FIG.4

| 501 |
|---|
| APPLICATION NAME |
| APPLICATION ID |
| VERSION |
| DESCRIPTION |
| TYPE |
| REQUIRED RESOURCES |
| OPERATION DEFAULT VALUES |
| INSTALL SETTING VALUES |
| ‥ |

FIG.8

| APPLICATION NAME |
| APPLICATION ID |
| VERSION |
| DESCRIPTION |
| TYPE |
| OPERATION DEFAULT VALUES |
| INSTALL SETTING VALUES |
| : |
| TYPE OF CHILD APPLICATION |
| APPLICATION ID OF CHILD APPLICATION |
| FILE NAME OF CHILD APPLICATION |
| : |

601

CHILD APPLICATION INFORMATION (FOR EACH CHILD APPLICATION)

DEVICE, INFORMATION PROCESSING METHOD, AND COMPUTER-READABLE STORAGE MEDIUM

CROSS-REFERENCE TO RELATED APPLICATIONS

This application is based upon and claims the benefit of priority of Japanese Patent Application No. 2011-172699, filed on Aug. 8, 2011, the entire contents of which are incorporated herein by reference.

BACKGROUND OF THE INVENTION

1. Field of the Invention

The present invention relates to a device, an information processing method, and a computer-readable storage medium having stored therein a program for causing a computer to perform information processing.

2. Description of the Related Art

Conventionally, there is an image forming apparatus which may be additionally installed with an application program (or application software) and the like after being forwarded to a user, in the form of a plug-in. For example, a Japanese Laid-Open Patent Publication No. 2007-49677 proposes an image forming apparatus that may be installed with an application developed in the C-language (hereinafter referred to as "C-application") and an application developed in the Java (registered trademark) language (hereinafter referred to as "J-application").

However, a platform for the C-application (hereinafter referred to as "C-application platform") and a platform for the J-application (hereinafter referred to as "J-application platform") are different. More particularly, in the J-application platform, there exists a platform, corresponding to a JSDK (Java Servlet Development Kit) platform of the Japanese Laid-Open Patent Publication No. 2007-49677, having an API (Application Program Interface) for the Java on the C-application platform.

The model dependency with respect to the C-application platform is greatly deteriorated in the case of the JSDK platform. In other words, the API of the JSDK platform is smoothened with respect to the model. Hence, from the point of view of the application developer, it may be advantageous to create a developing target application in the form of the J-application. This is because the need for changing the source code is low in the case of the J-application, and the development cost may be reduced.

However, a function range of the API provided by the JSDK platform is narrower than a function range of the API provided by the C-application platform. In other words, the number of functions realizable by a pure J-application is lower than that realizable by a pure C-application. The pure J-application refers to the J-application that is formed solely by program modules operating on the JSDK platform.

Accordingly, the function that is not realizable solely by the J-application needs to be implemented as a C-application. In this case, a module of the J-application and a module of the C-application coexist in a package that is marketed as a single application.

The application in which the J-application and the C-application coexist may appear as a single application when viewed from the user. However, when viewed from an image forming apparatus that does not take into consideration an application having such a structure, the J-application and the C-application coexisting in the single application appear as two separate applications. For this reason, there may be a problem in that the user needs to perform two install operations, that is, instruct execution of the install operation two separates times.

SUMMARY OF THE INVENTION

Accordingly, one embodiment of the present invention may provide a novel and useful device, information processing method, and computer-readable storage medium, in which the problem described above may be suppressed.

One embodiment of the present invention may improve the ease with which an operation may be performed on a program in which two or more programs coexist.

According to one aspect of the present invention, a device may include a processing unit including a first manager configured to store attribute information of a first program in a first storage unit, in response to an install request to install the first program; and a second manager configured to store attribute information of a second program in a second storage unit, in response to an install request to install the second program, wherein the second manager stores attribute information of a third program and attribute information of the second program included in the third program in the second storage unit, and stores attribute information of the first program included in the third program in the first storage unit, in response to an install request to install the third program that includes the first program and the second program.

Other objects and further features of the present invention will be apparent from the following detailed description when read in conjunction with the accompanying drawings.

BRIEF DESCRIPTION OF THE DRAWINGS

FIG. 4 is a diagram illustrating an example of a structure of a SDK application attribute file;

FIG. 8 is a diagram illustrating an example of a structure of a hybrid application attribute file;

DESCRIPTION OF THE PREFERRED EMBODIMENTS

Figure 1:
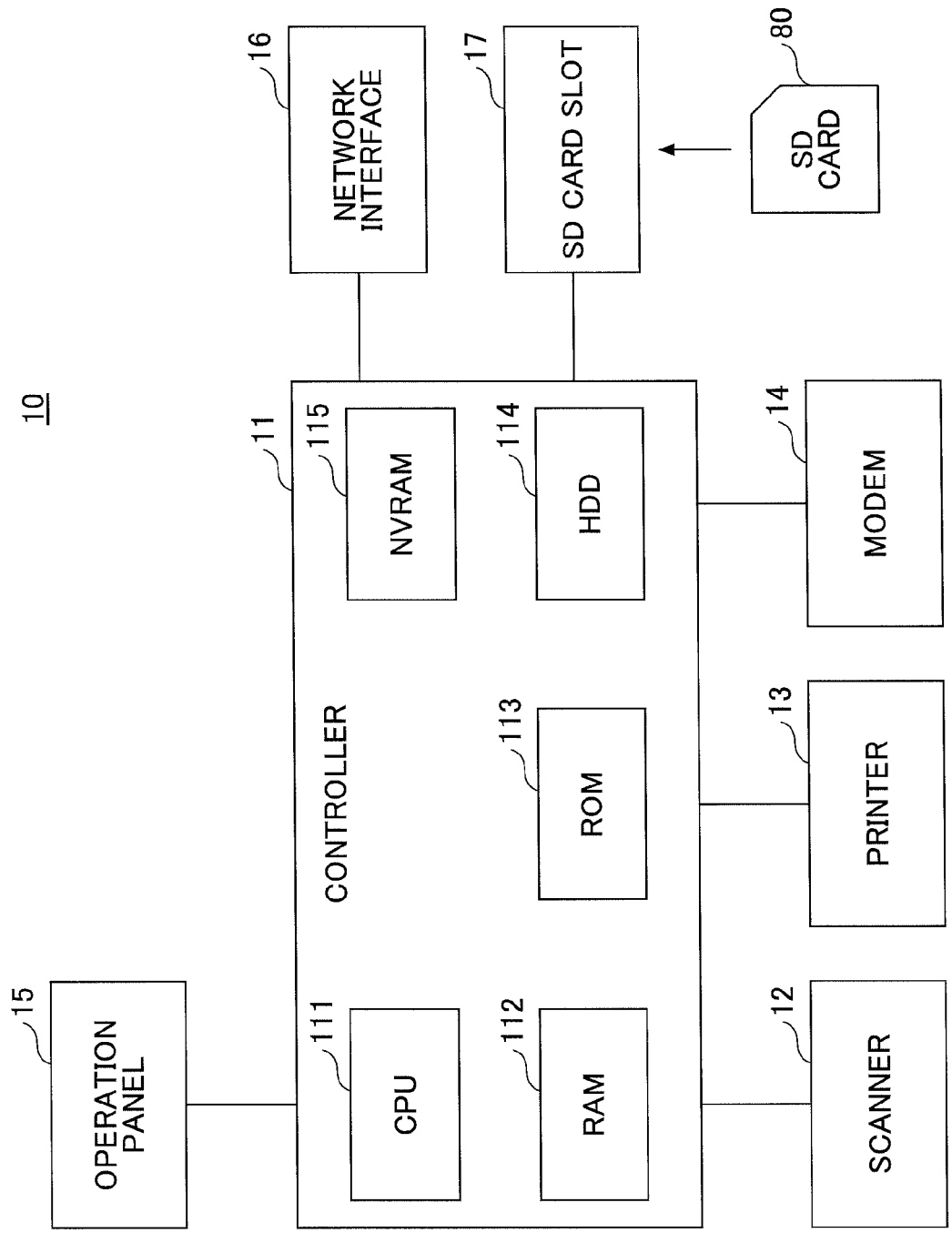
FIG. 1 is a block diagram illustrating an example of a hardware structure of an image forming apparatus in an embodiment of the present invention.

A description will be given of embodiments of the device, information processing method, and computer-readable storage medium according to the present invention, by referring to the drawings.

FIG. 1 is a block diagram illustrating an example of a hardware structure of an image forming apparatus in an embodiment of the present invention. An image forming apparatus 10 illustrated in FIG. 1 may include a controller 11, a scanner 12, a printer 13, a modem 14, an operation panel 15, a network interface 16, a SD (Secure Digital) card slot 17, and the like.

The controller 11 may include a CPU (Central Processing Unit) 111, a RAM (Random Access Memory) 112, a ROM (Read Only Memory) 113, a HDD (Hard Disk Drive) 114, a NVRAM (Non-Volatile RAM) 115, and the like. The ROM 113 may store various programs, data used by the programs, and the like. The RAM 112 may provide a storage region to load programs, work regions for the loaded programs, and the like. The CPU 111 may execute the loaded programs to realize various functions. The HDD 114 may store programs, various data used by the programs, and the like. The NVRAM 115 may store various setting information and the like.

The scanner 12 is an example of a hardware (image reading unit or means) to read image data from a document. The printer 13 is an example of a hardware (printing unit or means) to print printing data on a printing sheet such as paper. The modem 14 is an example of a hardware connectable to a telephone line, and may be used to transmit and/or receive image data according to a facsimile communication, for example. The operation panel 15 is an example of a hardware forming an input unit or means operated (or manipulated) by a user, and a display unit or means. The input unit or means may include a keyboard, buttons, and the like to accept inputs from the user. The display unit or means may be formed by a LCD (Liquid Crystal Display) panel or the like to display information with respect to the user. The operation panel 15 may be formed by a touch-screen panel. The network interface 16 is an example of a hardware to connect to a network such as a LAN (Local Area Network). The network may be a cable network, a wireless network, or a combination of cable and wireless networks. The SD card slot 17 may read a program stored in a SD card 80. In other words, in the image forming apparatus 10, not only the program stored in the ROM 113 but also the program stored in the SD card 80 may be loaded into the RAM 112 to be executed by the CPU 111. Of course, the SD card slot 17 may be replaced by a medium slot or hardware configured to read the program stored in a CD-ROM (Compact Disk-ROM), a USB (Universal Serial Bus) memory, and the like. The type of storage medium that stores the program to be read by the SD card slot 17 or the medium slot is not limited to the SD card 80. The medium slot or hardware to replace the SD card slot 17 may be appropriately selected depending on the type of storage medium from which the program is to be read.

Of course, any suitable computer-readable storage medium, including a non-transitory computer-readable storage medium, may store one or more programs.

Figure 2:
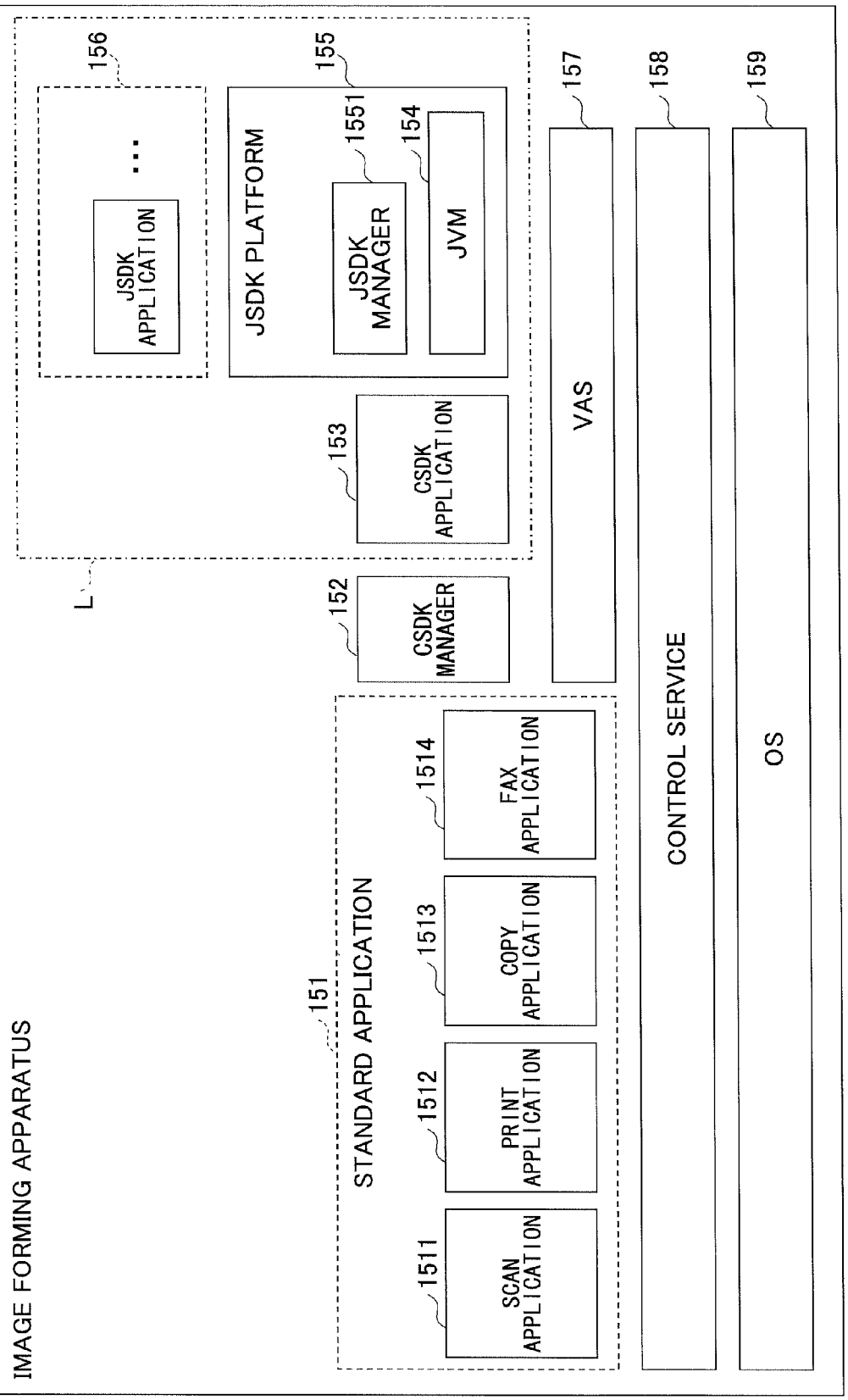
FIG. 2 is a diagram illustrating an example of a software structure of the image forming apparatus in an embodiment of the present invention.

FIG. 2 is a diagram illustrating an example of a software structure of the image forming apparatus in an embodiment of the present invention. In FIG. 2, the image forming apparatus 10 may include a standard application 151, a CSDK manager 152, a CSDK application 153, a JSDK platform 155, a JSDK application 156, a VAS (Virtual Application Service) 157, a control service 158, and an OS (Operating System) 159.

Each software of the image forming apparatus 10 may operate as a process or a thread on the OS 159.

The standard application 151 may be a set of applications that are preinstalled as standard when the image forming apparatus 10 is forwarded to the user. In FIG. 2, the standard application 151 may include a scan application 1511, a print application 1512, a copy application 1513, and a facsimile application 1514. The scan application 1511 may execute a scan job, and the print application 1512 may execute a print job. The copy application 1513 may execute a copy job, and the facsimile application 1514 may execute a facsimile transmission job or a facsimile reception job.

The control service 158 may be formed by a software module group to provide functions to control various hardware resources and the like with respect to a host application (or an application in a higher hierarchical level), execute basic functions of the image forming apparatus 10, and the like.

The VAS 157 may wrap an interface of the control service 158, and absorb a difference in the interface accompanied by an updated version of the control service 158. Hence, compatibility between the versions of the control service 158 may be guaranteed with respect to a program (particularly the CSDK application 153) operating on the VAS 157.

Each of the CSDK application 153 and the JSDK application 156 may be a type of SDK application. The SDK application may refer to an application that is developed as a plug-in with respect to the image forming apparatus 10, in order to extend the functions of the image forming apparatus 10. In other words, the image forming apparatus 10 may include dedicated APIs (Application Program Interfaces) for the SDK application, that is laid open. The APIs may include a C-language API that is provided by the VAS 157, and a Java-language API that is provided by the JSDK platform 155 to be described later. The CSDK application 153 may refer to a SDK application that is created using the C-language API. The JSDK application 156 may refer to a SDK application that is created using the Java-language API. In FIG. 2, the CSDK application 153 is illustrated by a single rectangular block, however, a plurality of CSDK applications 153 may be installed into one image forming apparatus 10.

The CSDK manager 152 may manage a life cycle of the CSDK application 153. For example, the CSDK manager 152 may control an install process (including an update process), a start process (or a boot process), a stop process, an uninstall process, and the like of the CSDK application 153.

The JSDK platform 155 may provide an executing environment of the JSDK application 156. In other words, the JSDK platform 155 may provide a Java-language API with respect to the JSDK application 156. The JSDK platform 155 may be one of the plurality of CSDK applications 153. Hence, the JSDK platform 155 may be installed from a storage medium, such as the SD card 80, for example, into the image forming apparatus 10 via the network. The JSDK platform 166 may be started as one process on the OS 159.

The JSDK platform 155 may include a JVM (Java Virtual Machine) 154 and a JSDK manager 1551.

The JVM 154 may interpret and execute instructions defined by Java byte codes.

The JSDK manager 1551 may manage a life cycle of the JSDK application 156. For example, the JSDK manager 1551 may control an install process (including an update process), a start process (or a boot process), a stop process, an uninstall process, and the like of the JSDK application 156. The JSDK manager 1551 may be installed as one JSDK application 156.

In FIG. 2, a part surrounded by a one-dot chain line L may illustrate a part that is installed via the storage medium, such as the SD card 80, or via the network. On the other hand, parts outside the part surrounded by the one-dot-chain line L may illustrate parts that are stored in the ROM 113 when the image forming apparatus 10 is forwarded to the user. In other words, the part surrounded by the one-dot chain line L may be added in order to extend the functions depending on the user's preferences on how the image forming apparatus 10 is to be used.

Next, a description will be given of a package format of the SDK application. The package format may refer to a file structure at the time of the distribution. In other words, the package format may refer to the file structure in a state in which the SDK application is stored in the storage medium such as the SD card 80, or the file structure with which the SDK application is transferred via the network.

Figure 3:
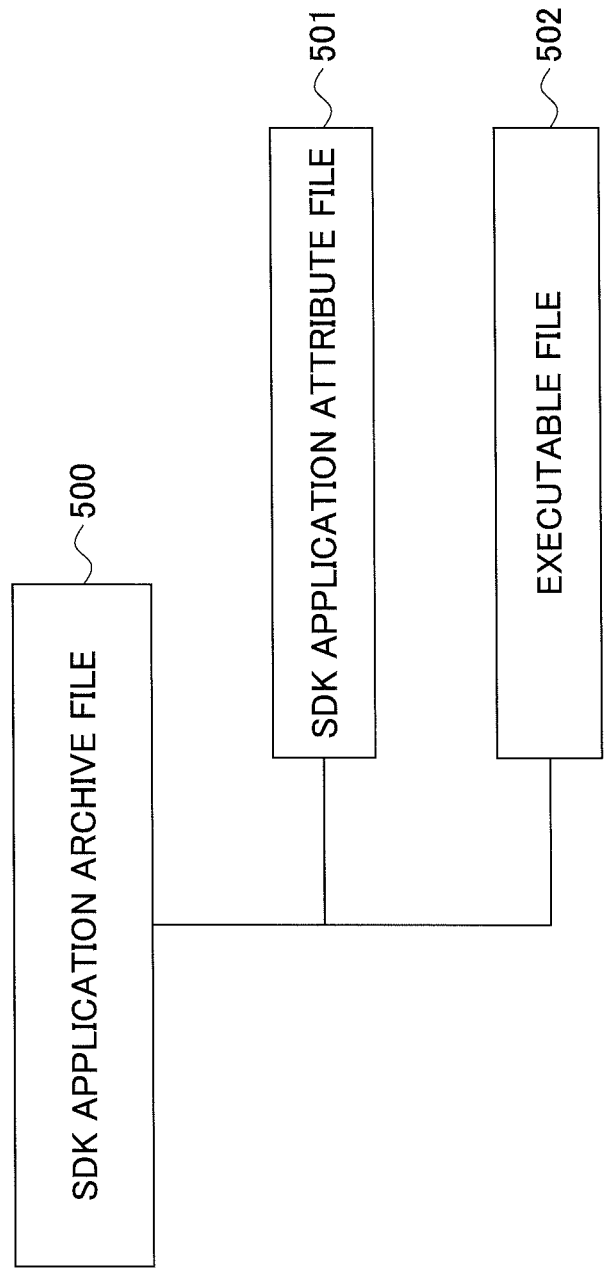
FIG. 3 is a diagram for explaining a package format of a SDK application in an embodiment.

FIG. 3 is a diagram for explaining the package format of the SDK application in an embodiment. In FIG. 3, an inclusion relationship between the files is represented in a tree format. One SDK application (CSDK application 153 and JSDK application 156) may be packaged into a single archive file (or SDK application archive file) 500. The SDK application archive file 500 may include a SDK application attribute file 501, an executable file 502, and the like. The SDK application attribute file 501 may be a text format (for example, XML (eXtensible Markup Language) format) file written with attribute information of the SDK application. The executable file 502 may be an executable file of the SDK application. One SDK application may be formed by a plurality of executable files 502. In addition, the file format of the executable file of the CSDK application 153 and the file format of the executable file of the JSDK application 156 may be different. The executable file of the CSDK application 153 may be a file in native code, and the executable file of the JSDK application 156 may be a file in Java byte code.

The SDK application may take a form other than the archive file. For example, in the storage medium (for example, SD card, etc.) that is the distribution medium for the SDK application, the file forming the SDK application may be stored in a normal file format. In this case, a directory may be formed in the storage medium, and each file may be arranged within the directory.

FIG. 4 is a diagram illustrating an example of a structure of the SDK application attribute file. The SDK application attribute file 501 may be written with values related to attribute items illustrated in FIG. 4.

In FIG. 4, an application name indicates a name of the SDK application. An application ID is an example of identification information of the SDK application. A version indicates a version of the SDK application. A description indicates a functional description and the like of the SDK application. A type indicates whether the SDK application is the CSDK application 153 or the JSDK application 156. For example, the CSDK manager 152 may judge whether the SDK application is the CSDK application 153 or the JSDK application 156, based on the value of the type of the SDK application that is an operation target on an application management screen 510 illustrated in FIG. 6 to be described later. Required resources indicate an amount of the RAM 112 used, an amount of the NVRAM 115 used, an amount of the HDD 114 used, and the like, for example. Operation default values are preset values of various parameters at the time when the SDK application operates. Install setting values are set values with respect to the various parameters at the time of the installing.

The structure of the SDK application attribute file 501 for the CSDK application 153 and the structure of the SDK application attribute file 501 for the JSDK application 156 do not necessarily have to match perfectly. In addition, the archive file of the CSDK application 153 and the archive file of the JSDK application 156 may have mutually different formats (for example, compression format, etc.).

Figure 5:
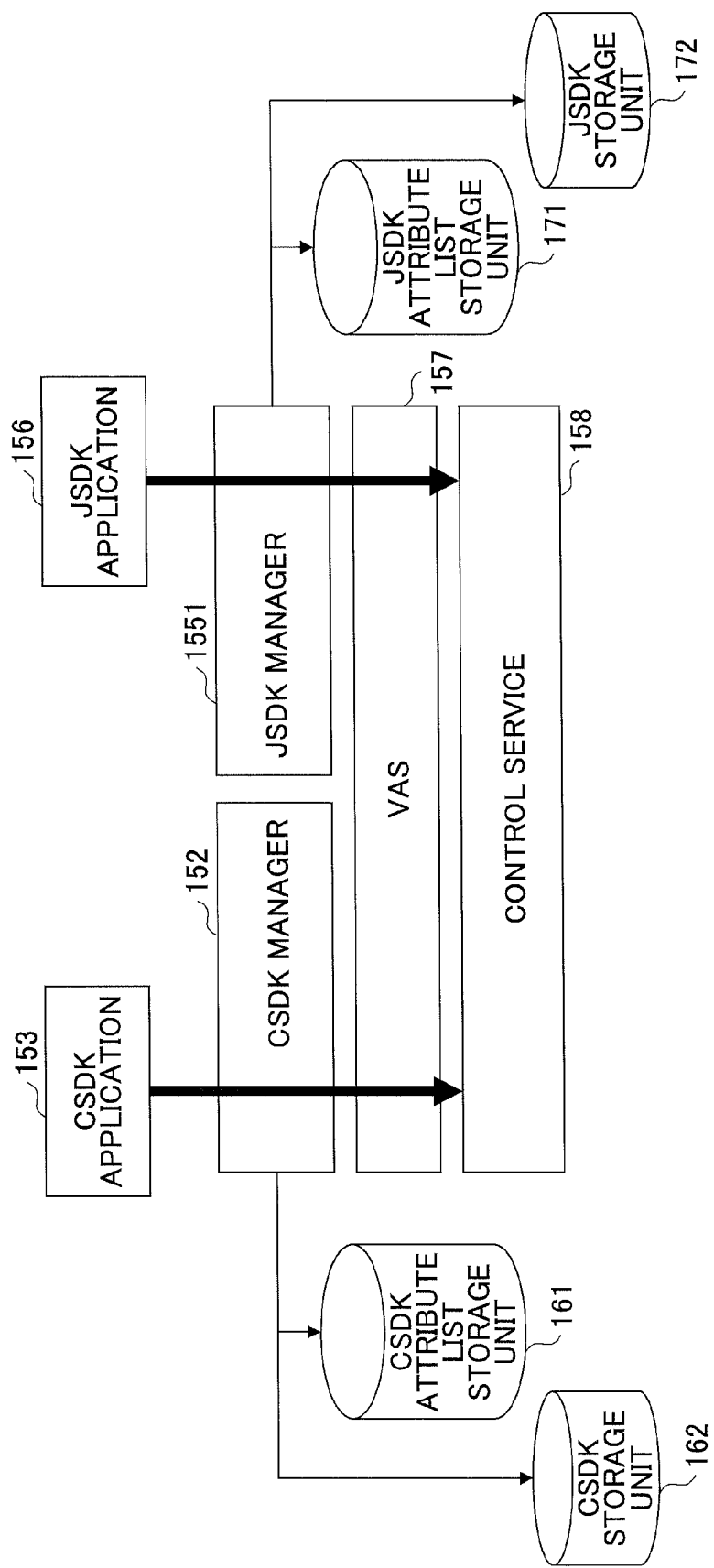
FIG. 5 is a diagram for explaining a management format of a life cycle of the SDK application.

As described above in conjunction with FIGS. 2 and 3, the management format for the life cycle of the SDK application may be summarized as illustrated in FIG. 5.

FIG. 5 is a diagram for explaining the management format of the life cycle of the SDK application. As illustrated in FIG. 5, the CSDK manager 152 may accept requests related to the install, start, stop, uninstall, and the like related to the CSDK application 153. The CSDK manager 152 may call the control service 156 via the VAS 157 when performing a process in response to the request. When installing the CSDK application 153, the CSDK manager 152 may obtain the SDK application attribute file 501 from the SDK application archive file 500 of the CSDK application 153, and store the written contents of the SDK application attribute file 501 in a CSDK attribute list storage unit 161. In addition, the CSDK manager 152 may obtain the executable file 502 from the SDK application archive file 500, and store the executable file 502 in a CSDK storage unit 162. The CSDK attribute list storage unit 161 may store a list of attribute information of each CSDK application 153 installed in the image forming apparatus 10. The CSDK storage unit 162 may store the executable file of each CSDK application 153 installed in the image forming apparatus 10.

On the other hand, the JSDK manager 1551 may accept requests related to the install, start, stop, uninstall, and the like related to the JSDK application 156. The JSDK manager 1551 may call the control service 156 via the VAS 157 when performing a process in response to the request. When installing the JSDK application 156, the JSDK manager 1551 may obtain the SDK application attribute file 501 from the SDK application archive file 500 of the JSDK application 156, and store the written contents of the SDK application attribute file 501 in a JSDK attribute list storage unit 171. In addition, the JSDK manager 1551 may obtain the executable file 502 from the SDK application archive file 500, and store the executable file 502 in a JSDK storage unit 172. The JSDK attribute list storage unit 171 may store a list of attribute information of each JSDK application 156 installed in the image forming apparatus 10. The JSDK storage unit 172 may store the executable file of each JSDK application 156 installed in the image forming apparatus 10.

The CSDK list storage unit 161, the CSDK storage unit 162, the JSDK list storage unit 171, and the JSDK storage unit 172 may be formed by the HDD 114, the NVRAM 115, and the like.

Figure 6:
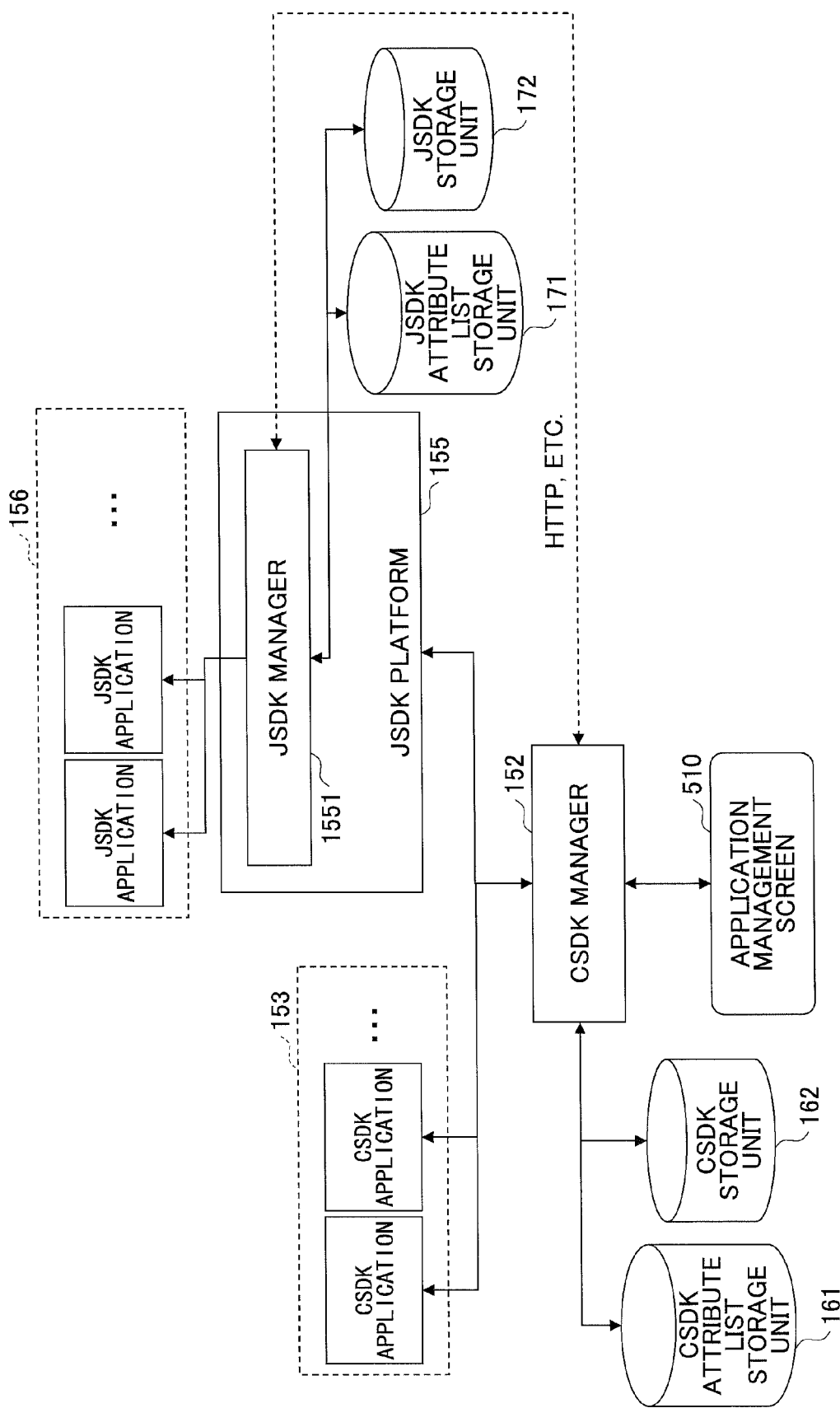
FIG. 6 is a diagram for explaining a relationship between a CSDK manager and a JSDK manager.

Next, a description will be given of a relationship between the CSDK manager 152 and the JSDK manager 1551, by referring to FIG. 6. FIG. 6 is a diagram for explaining the relationship between the SDK manager and the JSDK manager.

As illustrated in FIG. 6, the CSDK manager 152 may manage life cycles of each of the CSDK applications 153 and the JSDK platform 155. As described above, because the JSDK platform 155 may be one of the CSDK applications 153, the JSDK platform 115 may be under the management of the CSDK manager 152. Each of the CSDK applications 153 and the JSDK platform 155 may be started as separate processes.

On the other hand, each of the JSDK applications 156 may be started as a separate thread on the JVM 154 by the JSDK manager 1551.

Hence, one of the reasons the management formats of the CSDK application 153 and the JSDK application 156 differ may be because the application developing languages differ between the two. For example, when the JSDK application 156 is to be controlled directly by the CSDK manager 152, an interface in the Java language needs to be called from within the source code in the C-language. As a result, a high-level programming technique may be needed, and processing contents thereof may become complex. In addition, the CSDK application 153 may be executed as a process, while the JSDK application 156 may be executed as a thread, and the execution formats may differ between the CSDK application 153 and the JSDK application 156. Hence, an application managing mechanism for the CSDK application 153 and an application managing mechanism for the JSDK application 156 may be provided separately when the different execution formats of the CSDK application 153 and the JSDK application 156 are taken into consideration, in order to simplify the application managing mechanism.

However, the interfaces for enabling the user to perform an operation such as the install, start, stop, uninstall, and the like of the CSDK application 53 and the JSDK application 156 may be integrated into a single interface. More particularly, the application management screen 510 that provides the user interface may be unified and displayed on the operation panel 15 by the CSDK manager 152. When the operation with respect to the SDK application is the install, the list of the SDK applications (CSDK application 153 or JSDK application 156) stored in the SD card 80, for example, may be displayed on the application management screen 510. The user may select the SDK application that is the install target from the list of the SDK applications. In addition, when the operation with respect to the SDK application is the uninstall, start, or stop, the list of the SDK applications that are installed in the image forming apparatus 10 may be displayed on the application management screen 510. The list information may be displayed based on the information stored in a CSDK attribute information storage unit and a JSDK attribute information storage unit.

The user may select the SDK application that is the target of the uninstall, start; or stop, from the list. When the CSDK application 153 displayed on the application management screen 510 is the operation target, the CSDK manager 152 may execute a process (install, start, stop, uninstall, and the like) depending on an operation instruction. On the other hand, when the JSDK application displayed on the application management screen 510 is the operation target, the CSDK manager 152 may notify the operation instruction to the JSDK manager 1551. The JSDK manager 1551 may execute a process (install, start, stop, uninstall, and the like) depending on the operation instruction notified from the CSDK manager 152.

Information exchange between the CSDK manager 152 and the JSDK manager 1551 may be performed using a convenient protocol regardless of the type of developing language, such as HTTP (HyperText Transfer Protocol), SOAP (Simple Object Access Protocol), and the like, for example. By using such a protocol, the interface in the Java language need not be called from within the source code in the C-language, and the complexity of the processing contents may be reduced.

In this embodiment, the application program (hereinafter referred to as a "hybrid application"), including (that is, formed by) both the CSDK application 153 and the JSDK application 156, may be the management target. The hybrid application may appear from the outside as if it were a single SDK application. More particularly, the hybrid application may have a package format similar to the SDK application (CSDK application 153 and JSDK application 156).

Figure 7:
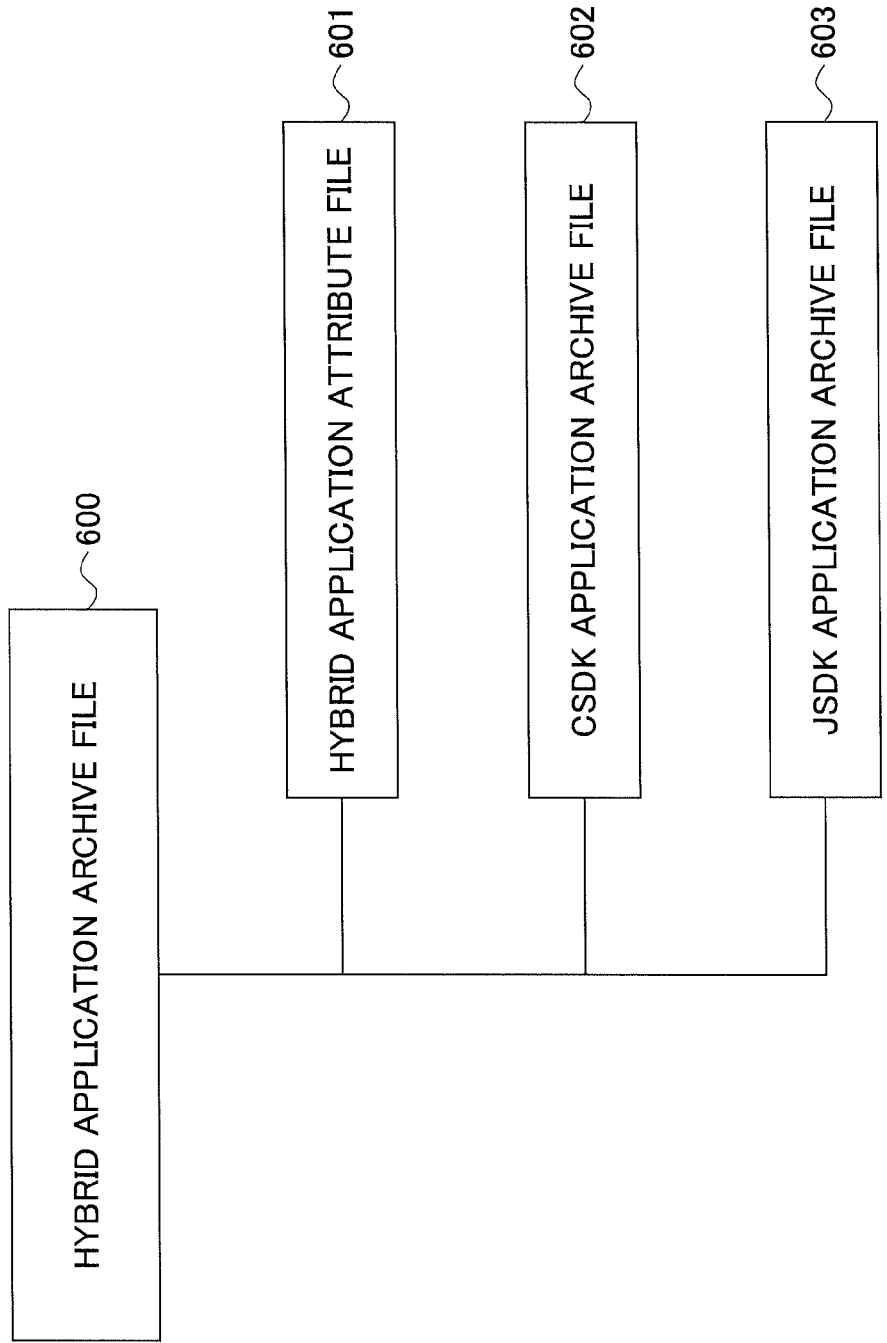
FIG. 7 is a diagram for explaining the package format of an hybrid application.

FIG. 7 is a diagram for explaining the package format of the hybrid application. In FIG. 7, the inclusion relationship between the files is also represented in the tree format.

One hybrid application may be packaged as a single archive file (hereinafter referred to as "hybrid application archive file") 600. The hybrid application archive file 600 may include a hybrid application attribute file 601, a CSDK application archive file 602, a JSDK application archive file 603, and the like. The hybrid application attribute file 601 may be a file in a text format (for example, XML format) written with attribute information of the hybrid application. The CSDK application archive file 602 may be the SDK application archive file 500 illustrated in FIG. 3 of the CSDK applications 153 belonging to the hybrid application. The JSDK application archive file 603 may be the SDK application archive file 500 illustrated in FIG. 3 of the JSDK applications 156 belonging to the hybrid application. In other words, the hybrid application archive file 600 may include the SDK application archive files 500 of the SDK applications belonging to the hybrid application in a nested state. FIG. 7 illustrates an example in which one CSDK application 153 and one JSDK application 156 are included in the hybrid application, however, a plurality of CSDK applications 153 and/or a plurality of JSDK applications 156 may be included in the hybrid application. In other words, a plurality of CSDK application archive files 602 and a plurality of JSDK application archive files 603 may be included in the hybrid application archive file 600.

The hybrid application may take a form other than the archive file. For example, in the storage medium (for example, SD card, etc.) that is the distribution medium for the hybrid application, the file forming the hybrid application may be stored in a normal file format. In this case, a directory may be formed in the storage medium, and each file may be arranged within the directory.

FIG. 8 is a diagram illustrating an example of the structure of the hybrid application attribute file. As illustrated in FIG. 8, the hybrid application attribute file 601 illustrated in FIG. 8 may include items included in the SDK application attribute file 501.

In FIG. 8, an application name indicates a name of the hybrid application. An application ID is an example of identification information of the hybrid application. The hybrid application may be regarded as an abstract application including the CSDK application 153 and the JSDK application 156, or as an aggregate of the CSDK application 153 and the JSDK application 156. Hence, the application name and the application ID of the hybrid application may be the name and the identifier of the abstract application or the aggregate. A type indicates whether the hybrid application is the CSDK application 153 or the JSDK application 156. In this example, the type of the hybrid application is the JSDK application 156, because as will be described later, the CSDK manager 152 is made to recognize the hybrid application as the JSDK application 156.

A version indicates a version of the hybrid application. A description indicates a functional description and the like of the hybrid application. A type indicates whether the hybrid application is the CSDK application 153 or the JSDK application 156. Operation default values are preset values of various parameters at the time when the hybrid application operates. Install setting values are set values with respect to the various parameters at the time of the installing.

The hybrid application attribute file 601 further includes child application information for each child application. The child application may refer to the CSDK application 153 or the JSDK application 156 included in the hybrid application. In other words, the relationship between the hybrid application and the SDK applications included in this hybrid application may be represented as a parent-child relationship. The child application information may include a type of the child application, an application ID of the child application, a file name of the child application, and the like. The file name of the child application may be the file name of the CSDK application archive file 602 or the JSDK application archive file 603 within the hybrid application archive file 600.

An example of a case in which the hybrid application is formed may be the case in which an interaction relationship (or relationship using each other) exists between the CSDK application 153 and the JSDK application 156. In addition, even when no direct interaction relationship exists between the CSDK application 153 and the JSDK application 156, the hybrid application may be formed when both the CSDK application 153 and the JSDK application 156 are not installed and it is difficult to provide a predetermined service.

Figure 9:
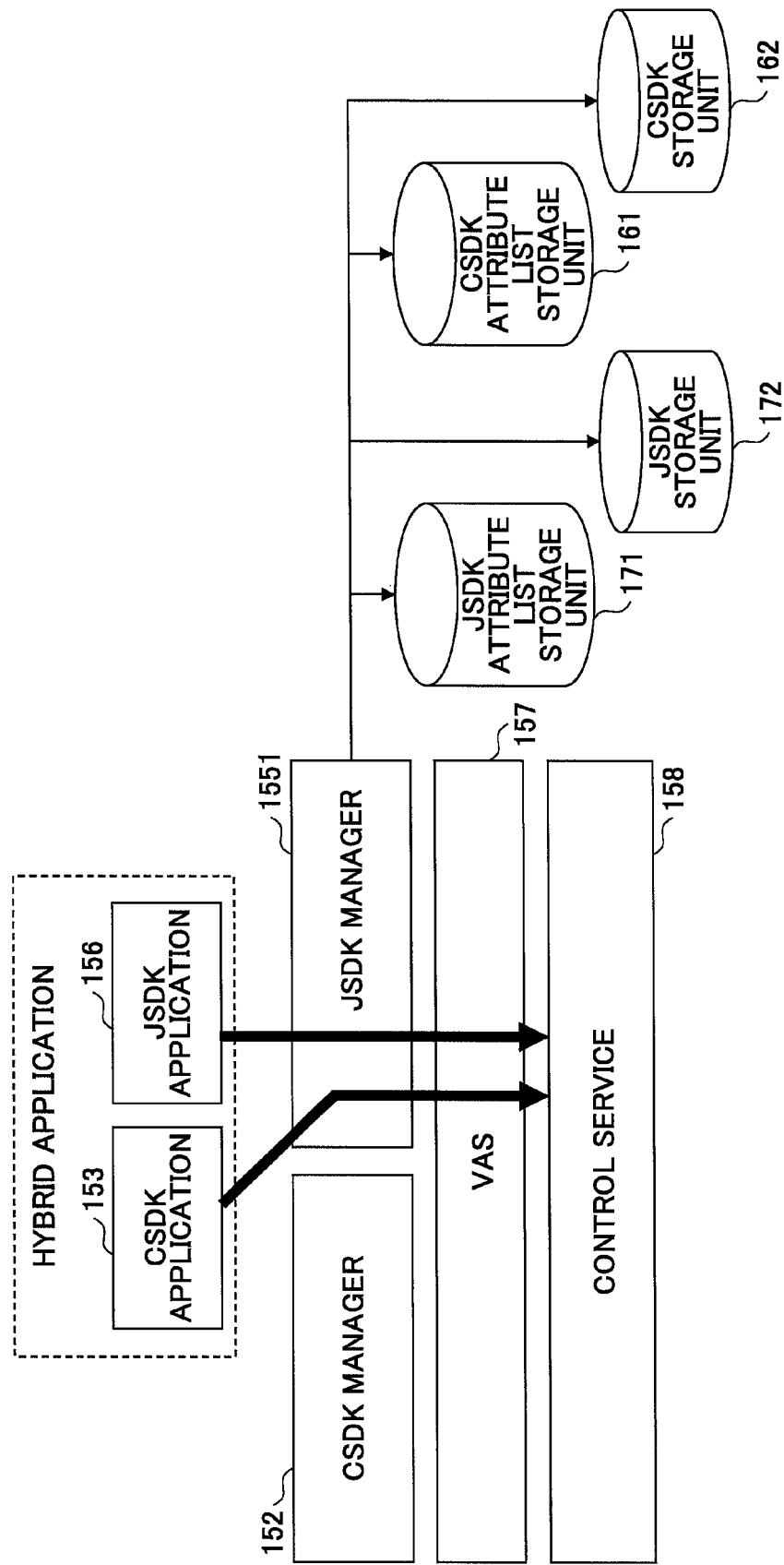
FIG. 9 is a diagram for explaining installing and uninstalling of the hybrid application in a first embodiment.

Next, a description will be given of the installing and uninstalling of the hybrid application, by referring to FIG. 9. FIG. 9 is a diagram for explaining the installing and uninstalling of the hybrid application in a first embodiment.

As illustrated in FIG. 9, the JSDK manager 1551 may control the install process and the uninstall process of not only the JSDK application 156 but also the CSDK application 153, with respect to the SDK applications included in the hybrid application. More particularly, the JSDK manager 1551 not only stores the attribute information and the execution format of the JSDK application 156 included in the hybrid application in the JSDK attribute list storage unit 171 or the JSDK storage unit 172, but also stores the attribute information and the execution format of the CSDK application 153 included in the hybrid application in the CSDK attribute list storage unit 161 or the CSDK storage unit 162.

Because the JSDK manager 1551 controls the install process and the uninstall process related to both the JSDK application 156 and the CSDK application 153 included in the hybrid application, the JSDK application 156 may centrally accept the instruction related to the installing or uninstalling. More particularly, when viewed from the user, one operation instruction related to one hybrid application may be input, in order to execute the installing or uninstalling of both the CSDK application 153 and the JSDK application 156 included in the hybrid application. In other words, suppose that the installing or uninstalling of the CSDK application 153 is executed by the CSDK manager 152 and the installing or uninstalling of the JSDK application 156 is executed by the JSDK manager 1551, with respect to the SDK applications included in the hybrid application. In this supposed case, the user may be required to input the operation instruction with respect to each of the CSDK manager 152 and the JSDK manager 1551. On the other hand, according to the image forming apparatus 10 of this embodiment, the user may be freed from having to perform such a troublesome operation of inputting the operation instruction with respect to each of the CSDK manager 152 and the JSDK manager 1551. Of course, one operation instruction may include one or more steps of input operations. For example, a transition may be made among a plurality of screens and an input may be required a plurality of times, in order to input one operation instruction with respect to one hybrid application that is the operation target.

Figure 10:
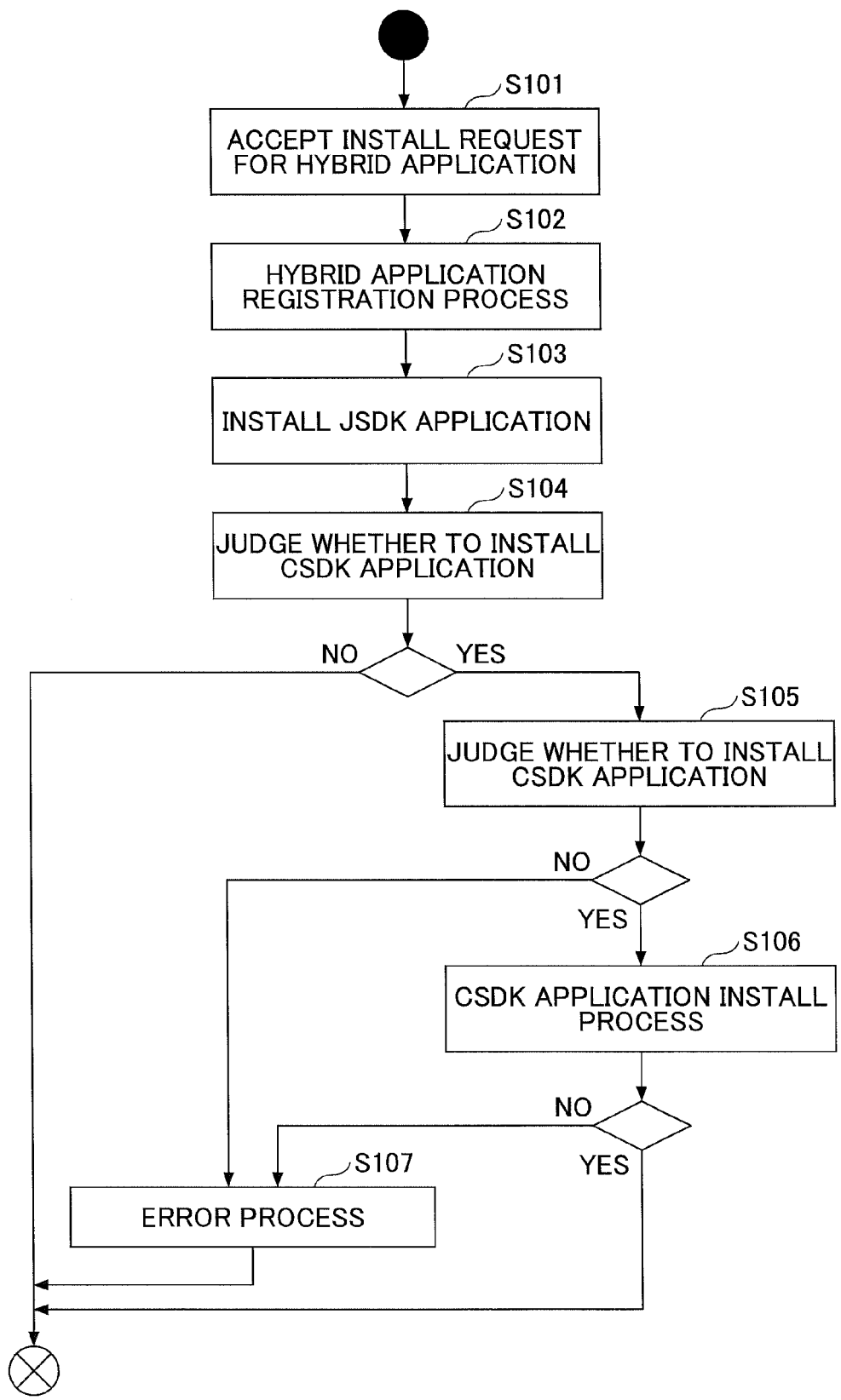
FIG. 10 is a flow chart for explaining an example of a processing sequence of a hybrid application install process in the first embodiment.
Figure 11:
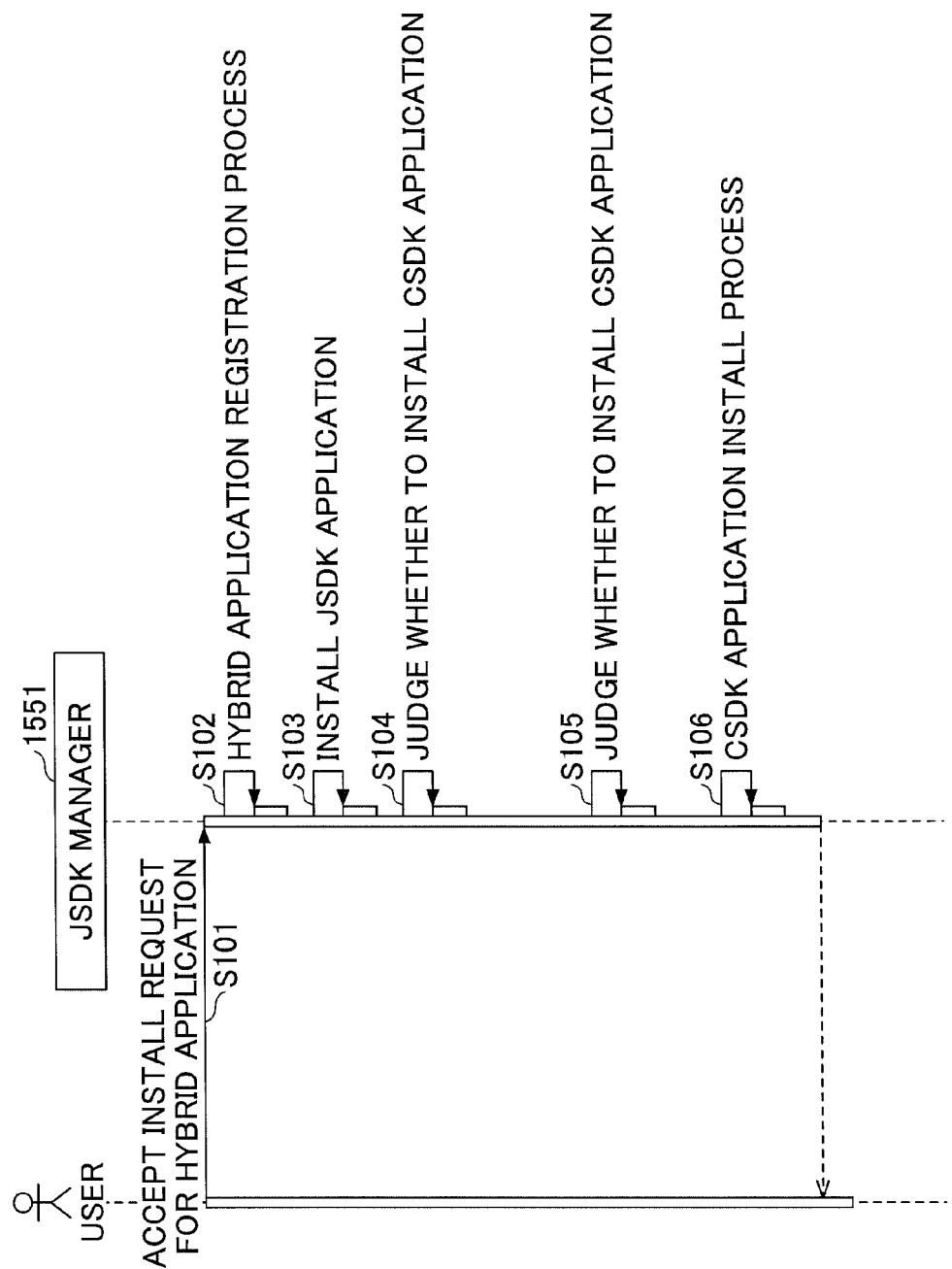
FIG. 11 is a sequence diagram for explaining the example of the processing sequence of the hybrid application install process in the first embodiment.

Next, a more detailed description will be given of the installing and uninstalling of the hybrid application, by referring to FIGS. 10 and 11. FIG. 10 is a flow chart for explaining an example of a processing sequence of a hybrid application install process in the first embodiment. In addition, FIG. 11 is a sequence diagram for explaining the example of the processing sequence of the hybrid application install process in the first embodiment. In FIGS. 10 and 11, those steps that are the same are designated by the same reference numerals.

In FIGS. 10 and 11, the JSDK manager 1551 may accept an install request to install the hybrid application (step S101). The install request to install the hybrid application may be input via the application management screen 510 that is displayed on the operation panel 15 by the CSDK manager 152, similarly as in the case of inputting the install request to install the SDK application. In other words, the CASK manager 152 may display on the application management screen 510, as installing candidates, the application name and the like of the hybrid applications stored in the hybrid application attribute file 601 included in the hybrid application archive file 600 stored in the SD card 80 that is loaded set in the SD card slot 17 of the image forming apparatus 10. The user may select, as the install target, a hybrid application on the application management screen 510. In other words, the user may input one install instruction with respect to one hybrid application. The CSDK manager 152 may send to the JSDK manager 1551 the install request to install the selected hybrid application. As described above, the type of the hybrid application has a value indicating the JSDK application 156 in this example. Hence, when viewed from the CSDK manager 152, the hybrid application appears as the JSDK application 156. Accordingly, the install instruction described above corresponds to the install request accepted in the step S101.

Next, the JSDK manager 1551 may execute a registration process to register the attribute information of the hybrid application (step S102). More particularly, the JSDK manager 1551 may extract (or unarchive) the hybrid application archive file 600 of the hybrid application into a work storage region (hereinafter referred to as a "work folder") of the HDD 114, for example. As a result, the hybrid application attribute file 601, the CSDK application archive file 602, the JSDK application archive file 603, and the like included in the hybrid application archive file 600 are unarchived in the work folder. The JSDK manager 1551 may store the attribute information included in the hybrid application attribute file 601 into the JSDK attribute list storage unit 171. In other words, the existence of the hybrid file is registered in the image forming apparatus 10 as one JSDK application 156.

Then, the JSDK manager 1551 may execute the install process of the JSDK application 156 that is the child application of the hybrid application (step S103). More particularly, the JSDK manager 1551 may refer to the child application information of the hybrid application attribute file 601 unarchived in the work folder, and specify the file name of the child application indicating the JSDK application 156 as the type of the child application. The JSDK manager 1551 may unarchive the file name related to the JSDK application archive file 603 in the work folder. As a result, the SDK application attribute file and the executable file included in the JSDK application archive file 603 may be unarchived in the work folder. The JSDK manager 1551 may store the attribute information included in the SDK application attribute file in the JSDK attribute list storage unit 171. In this state, the JSDK manager 1551 may relate the attribute information stored in the JSDK attribute list storage unit 171 to the executable file stored in the JSDK storage unit 172. For example, the JSDK manager 1551 may add position information (for example, file path name) of the executable file in the JSDK storage unit 172 with respect to the attribute information in the JSDK attribute list storage unit 171. When a plurality of JSDK applications 156 are included in the hybrid application, the step S103 may be executed a number of times corresponding to the number of JSDK applications 156 included in the hybrid application.

Next, the JSDK manager 1551 may judge whether the child application of the hybrid application, namely, the CSDK application 153, is to be installed (step S104). More particularly, the JSDK manager 1551 may judge whether the attribute information related to the CSDK application 153 is stored in the CSDK attribute list storage unit 161. That is, the JSDK manager 1551 may refer to the child application information of the hybrid application attribute file 601 unarchived in the work folder, and specify the file name of the child application indicating the CSDK application 153 as the type of the child application. The CSDK manager 152 may unarchive the CSDK application archive file 602 related to the file name in the work folder. As a result, the SDK application attribute file and the executable file included in the CSDK application archive file 602 may be unarchived in the work folder. The JSDK manager 1551 may judge whether the attribute information related to the application name, the application ID, and the version, included in the SDK attribute file, is stored in the CSDK attribute list storage unit 161. In other words, in past install operations, the CSDK application 153 alone may be installed. Hence, the step S104 may judge whether the CSDK application 153 is installed.

When the installing of the CSDK application 153 is unnecessary, that is, when the CSDK application 153 is installed, the JSDK manager 1551 may end the install process to install the hybrid application.

On the other hand, when the installing of the CSDK application 153 is necessary, that is, the CSDK application 153 is not installed, the JSDK manager 1551 may judge whether the CSDK application 153 is to be installed (step S105). For example, a confirmation is made on whether an amount of vacant resources specified as required resources of the CSDK attribute file of the CSDK application 153 exists. In addition, a confirmation is made on whether an upper limit of the number of times the CSDK application 153 may be installed is reached.

When the CSDK application 153 is installable, the JSDK manager 1551 may execute the install process of the CSDK application 153 (step S106). More particularly, the JSDK manager 1551 may store the attribute information included in the SDK application attribute file of the CSDK application 153 in the CSDK attribute list storage unit 161. Further, the JSDK manager 1551 may store the executable file of the CSDK application 153 in the CSDK storage unit 162. In this state, the JSDK manager 1551 may relate the attribute information stored in the CSDK attribute list storage unit 161 and the executable file stored in the CSDK storage unit 162. For example, the JSDK manager 1551 may add position information (for example, file path name) of the executable file in the CSDK storage unit 162 with respect to the attribute information in the CSDK attribute list storage unit 161.

When the install process succeeds, the JSDK manager 1551 may end the install process to install the hybrid application. In this case, the user may restart (or reboot) the image forming apparatus 10, in order to validate the results of the install process.

On the other hand, when the installing of the CSDK application 153 is impossible, or when the install process of the CSDK application 153 fails, the JSDK manager 1551 may display an error message or the like on the operation panel 15, for example (step S107), and end the install process to install the hybrid application. When a plurality of CSDK applications 153 are included in the hybrid application, the step S104 and the subsequent steps may be executed a number of times corresponding to the number of CSDK applications 153 included in the hybrid application.

The start and stop of the CSDK application 153 that is installed as the child application of the hybrid application may be executed by the CSDK manager 152. For example, the CSDK manager 152 may start the executable file stored in the CSDK storage unit 162, at the start of the image forming apparatus 10, or according to a start instruction that is input via the application management screen 510.

In addition, the start and stop of the JSDK application 156 that is installed as the child application of the hybrid application may be executed by the JSDK manager 1551. For example, the JSDK manager 1551 may start the executable file stored in the JSDK storage unit 172, at the start of the image forming apparatus 10, or according to a start instruction that is input via the application management screen 510.

Figure 12:
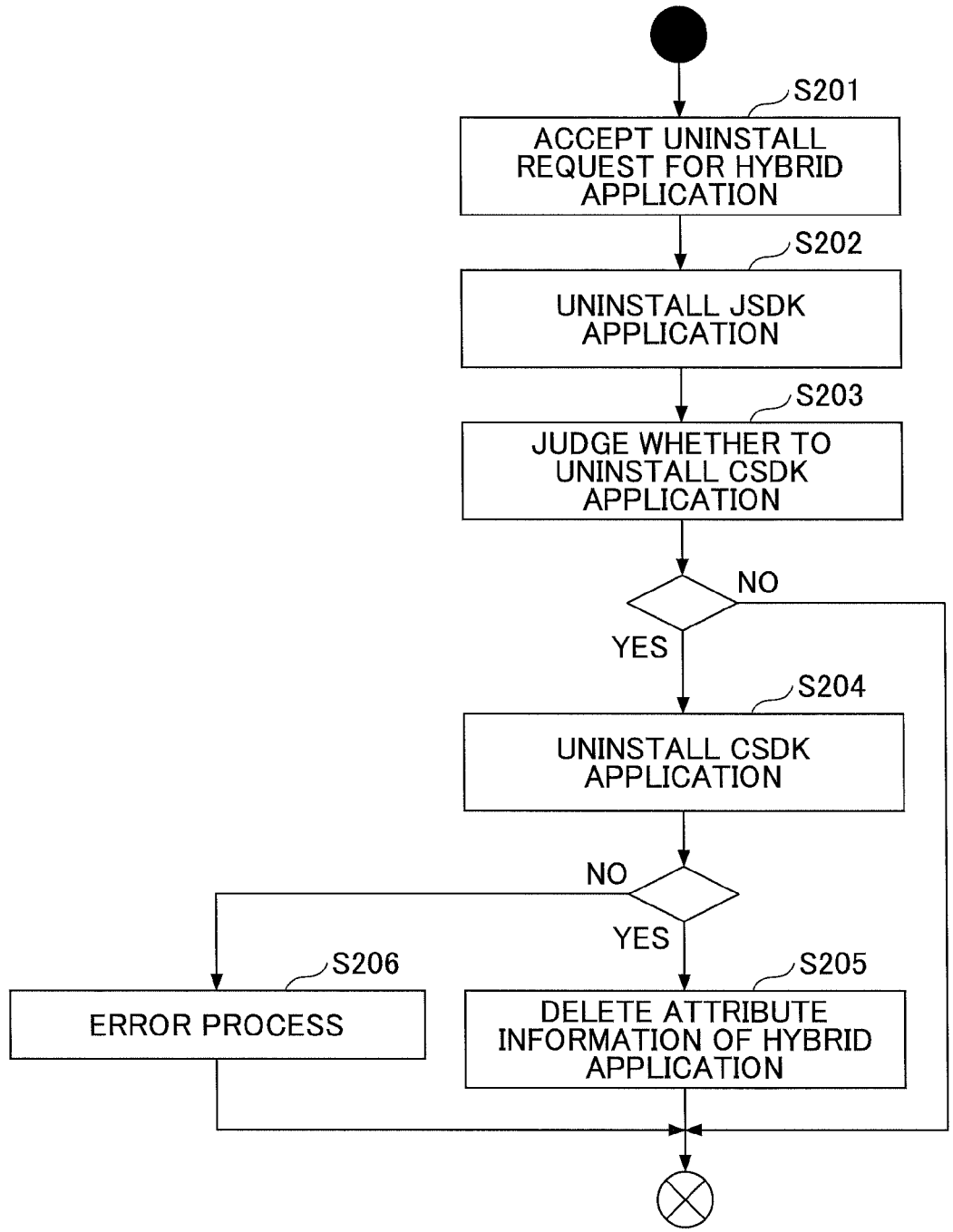
FIG. 12 is a flow chart for explaining an example of a processing sequence of a hybrid application uninstall process in the first embodiment.
Figure 13:
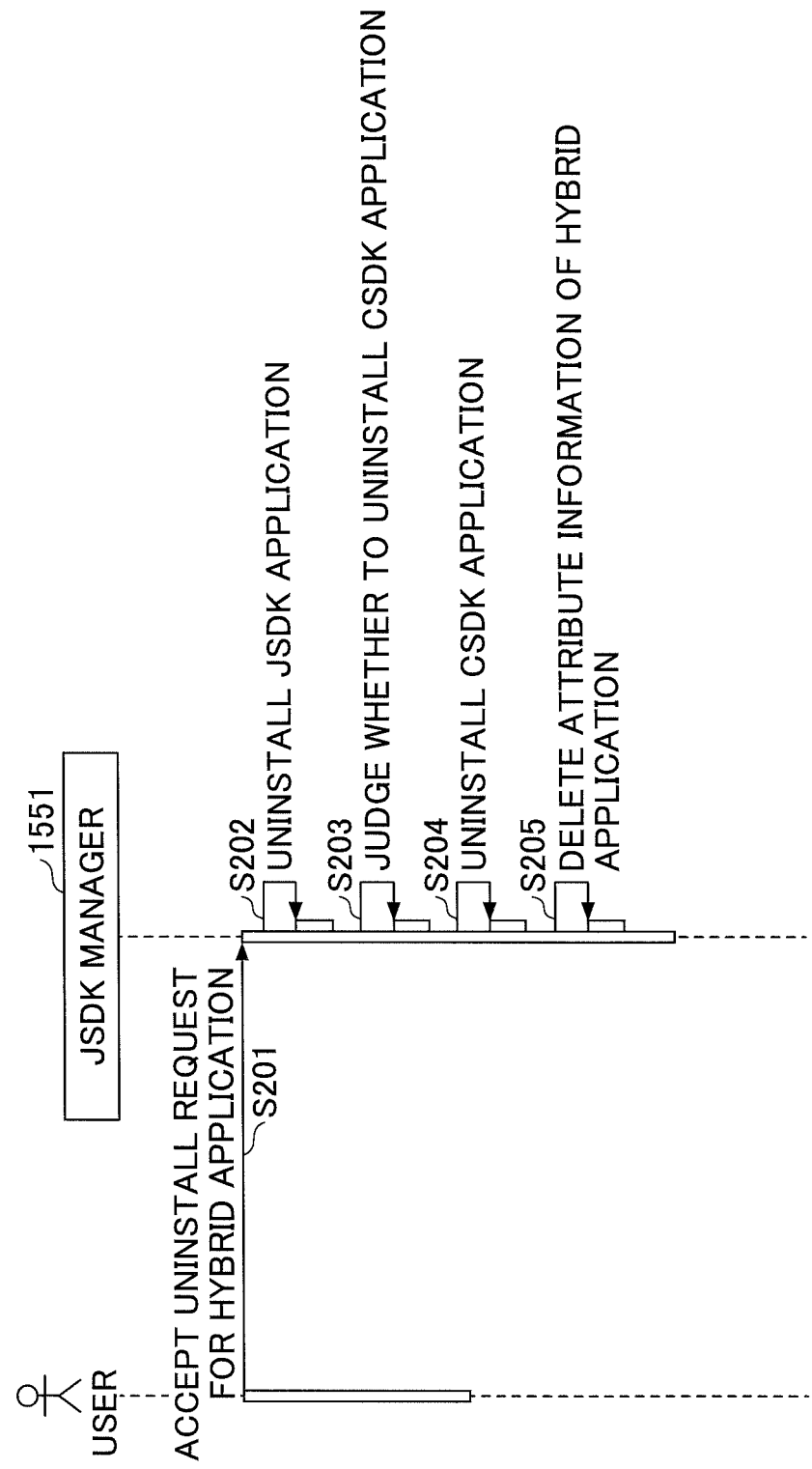
FIG. 13 is a sequence diagram for explaining the example of the hybrid application uninstall process in the first embodiment.

Next, a description will be given of the uninstalling process of the hybrid application, by referring to FIGS. 12 and 13. FIG. 12 is a flow chart for explaining an example of a processing sequence of a hybrid application uninstall process in the first embodiment. In addition, FIG. 13 is a sequence diagram for explaining the example of the hybrid application uninstall process in the first embodiment. In FIGS. 12 and 13, those steps that are the same are designated by the same reference numerals.

In FIGS. 12 and 13, the JSDK manager 1551 may accept an uninstall request to uninstall the hybrid application (step S201). The uninstall request may be accepted in the following manner.

The CSDK manager 152 may display a list of the application names and the like of the CSDK application 153, the JSDK application 156, and the hybrid application installed in the image forming apparatus 10, based on the list of attribute information stored in the CSDK attribute list storage unit 161 or the JSDK attribute list storage unit 171, on the application management screen 510 as the operation target candidates. As described above in conjunction with FIGS. 10 and 11, the attribute information of the hybrid application is also stored in the JSDK attribute list storage unit 171, and thus, the application name and the like of the hybrid application are also displayed as the operation target candidates. However, the CSDK manager 152 excludes from the operation target candidates the CSDK application 153 and the JSDK application 156 that are child applications of the hybrid application. By making such an exclusion, the existence alone of the hybrid application may be provided to the user at the time of the uninstalling. The CSDK application 153 and the JSDK application 156 that are child applications of the hybrid application may be specified based on the child application information of the attribute information of the hybrid application. In other words, the CSDK application 153 or the JSDK application 156 that is the child application of the hybrid application may be specified based on the application name and the application ID included in the child application information.

In the step S201, the hybrid application may be selected from the list of the operation target candidates that are displayed, and when an uninstall instruction is input by the user, the JSDK manager 1551 may accept the uninstall request to uninstall the hybrid application.

Next, the JSDK manager 1551 may execute an uninstall process with respect to the JSDK application 156 that is the chilled application of the hybrid application (step S202). More particularly, with respect to the JSDK application 156, the JSDK manager 1551 may delete the attribute information from the JSDK attribute list storage unit 171, and delete the executable file related to the deleting attribute information from the JSDK storage unit 172. When a plurality of JSDK applications 156 exist as the child applications of the hybrid application, the step S202 may be executed a number of times corresponding to the number of JSDK applications 156 included in the hybrid application.

Next, the JSDK manager 1551 may judge whether the CSDK application 153 that is the child application of the hybrid application is to be uninstalled (step S203). More particularly, the JSDK manager 1551 may confirm whether the attribute information related to the CSDK application 153 is stored in the CSDK attribute list storage unit 161.

When the attribute information related to the CSDK application 153 is not stored in the CSDK attribute list storage unit 161, that is, when the CSDK application 153 is not installed, the JSDK manager 1551 may end the uninstall process to uninstall the hybrid application.

On the other hand, when the attribute information related to the CSDK application 153 is stored in the CSDK attribute list storage unit 161, that is, when the CSDK application 153 is installed, the JSDK manager 1551 may execute the uninstall process to uninstall the CSDK application 153 (step S204). More particularly, with respect to the CSDK application 153, the JSDK manager 1551 may delete the attribute information from the CSDK attribute list storage unit 161, and delete the executable file related to the deleting attribute information from the CSDK storage unit 162. When the uninstall process to uninstall the CSDK application 153 fails, the JSDK manager 1551 may display an error message or the like on the operation panel 15 (step S206), and end the uninstall process to uninstall the hybrid application.

On the other hand, when the uninstall process to uninstall the hybrid application succeeds, the JSDK manager 1551 may delete the attribute information of the hybrid application from the JSDK attribute list storage unit 171 (step S205).

When a plurality of CSDK applications 153 exist as the child applications of the hybrid application, the step S203 and the subsequent steps may be executed a number of times corresponding to the number of CSDK applications 153 included in the hybrid application.

The instruction to install or uninstall the hybrid application may be input from an information processing apparatus, such as a PC (Personal Computer), that is connected to the image forming apparatus 10 via a network. In other words, the information processing apparatus may be used in a manner similar to the operation panel 15 of the image forming apparatus 10.

Next, a description will be given of processing sequences of a hybrid application remote install process and a hybrid application remote uninstall process, by referring to FIG. 14.

Figure 14:
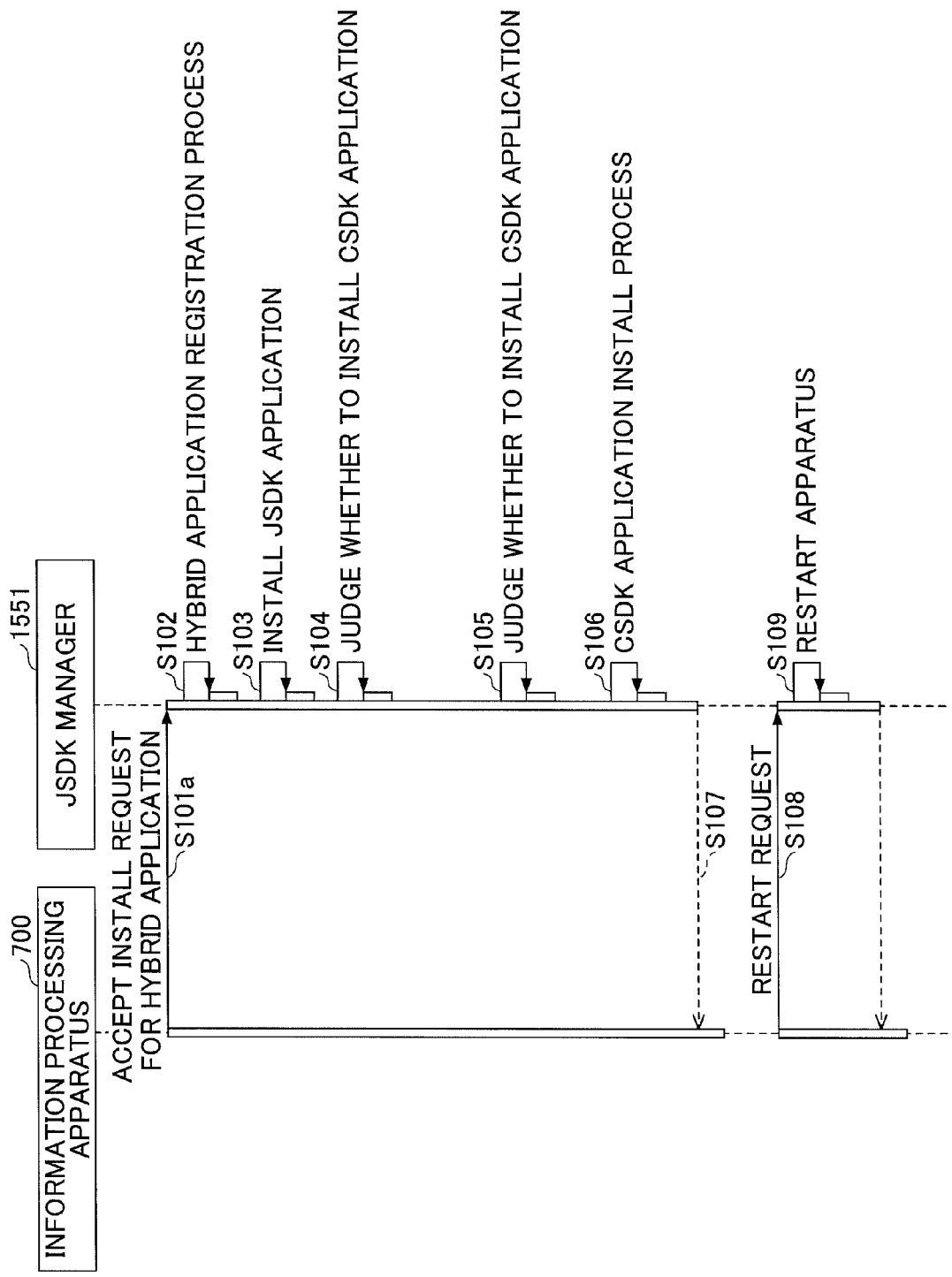
FIG. 14 is a sequence diagram for explaining an example of a processing sequence of a hybrid application remote install process in the first embodiment.

FIG. 14 is a sequence diagram for explaining an example of the processing sequence of the hybrid application remote install process in the first embodiment. In FIG. 14, those steps that are the same as those corresponding steps in FIG. 11 are designated by the same reference numerals, and a description thereof will be omitted.

In FIG. 14, a step S101a may be executed in place of the step S101. In the case of the remote installing, the install request (or install instruction) may be received from an information processing apparatus 700 via the network. In this case, the hybrid application archive file 600 may be transferred via the network, simultaneously as the install request.

In addition, when the install process is completed, the JSDK manager 1551 may send a complete notification to the information processing apparatus 700 (step S107). In response to the complete notification, the information processing apparatus 700 may send a restart request to the image forming apparatus 10 (step S108). When the restart request is received, the OS 159 may restart the image forming apparatus 10 (step S109). In other words, in the case of the remote installing, the user may not be present near the image forming apparatus 10, and in this case, the user may not be able to operate a power button to restart the image forming apparatus 10. Hence, in the case of the remote installing, the information processing apparatus 700 instructs the restart of the image forming apparatus 10 via the network.

With regard to the remote uninstalling, the information processing apparatus 700 may be used in a manner similar to the operation panel 15 of the image forming apparatus 10. Otherwise, the process that is executed in the case of the remote uninstalling may be the similar to the process described above in conjunction with FIGS. 12 and 13.

Therefore, according to the first embodiment, the load on the user to perform operations may be reduced when executing the install process to install to hybrid application or the uninstall process to uninstall the hybrid application. In other words, the user may not be required to input the install instruction or the uninstall instruction for each CSDK application 153 and each JSDK application 156 included in the hybrid application, and the operation may be performed on the hybrid application as if it were a single application program. For this reason, it may be possible to improve the ease with which an operation may be performed on a program in which two or more programs coexist.

In the first embodiment, the CSDK application 153 may be an example of a first program, and the JSDK application 156 may be an example of a second program. The hybrid application may be an example of a third program. The CSDK manager 152 may be an example of a first manager, and the JSDK manager 1551 maybe an example of a second manager. The CSDK attribute list storage unit 161 may be an example of a first storage unit, and the JSDK attribute list storage unit 171 may be an example of a second storage unit. The operation panel 15 may be an example of a display unit.

In the embodiment, the first program and the second program may be distinguished (or discriminated by type) mainly using the difference between the program languages as a reference. However, the first program may be distinguished from the second program or vice versa, based on features other than the difference between the program languages. For example, even when the program languages are the same, the programs having mutually different management formats of the life cycle, based on the difference between the package formats or the like, may satisfy the relationship of the first program and the second program.

In addition, although the image forming apparatus 10 is described as an example of the device, the embodiment may be applied to devices, apparatuses, and equipments other than the image forming apparatus 10. In this case, the device may have a structure installable with programs, and provide various services or functions under the control of the programs.

Figure 15:
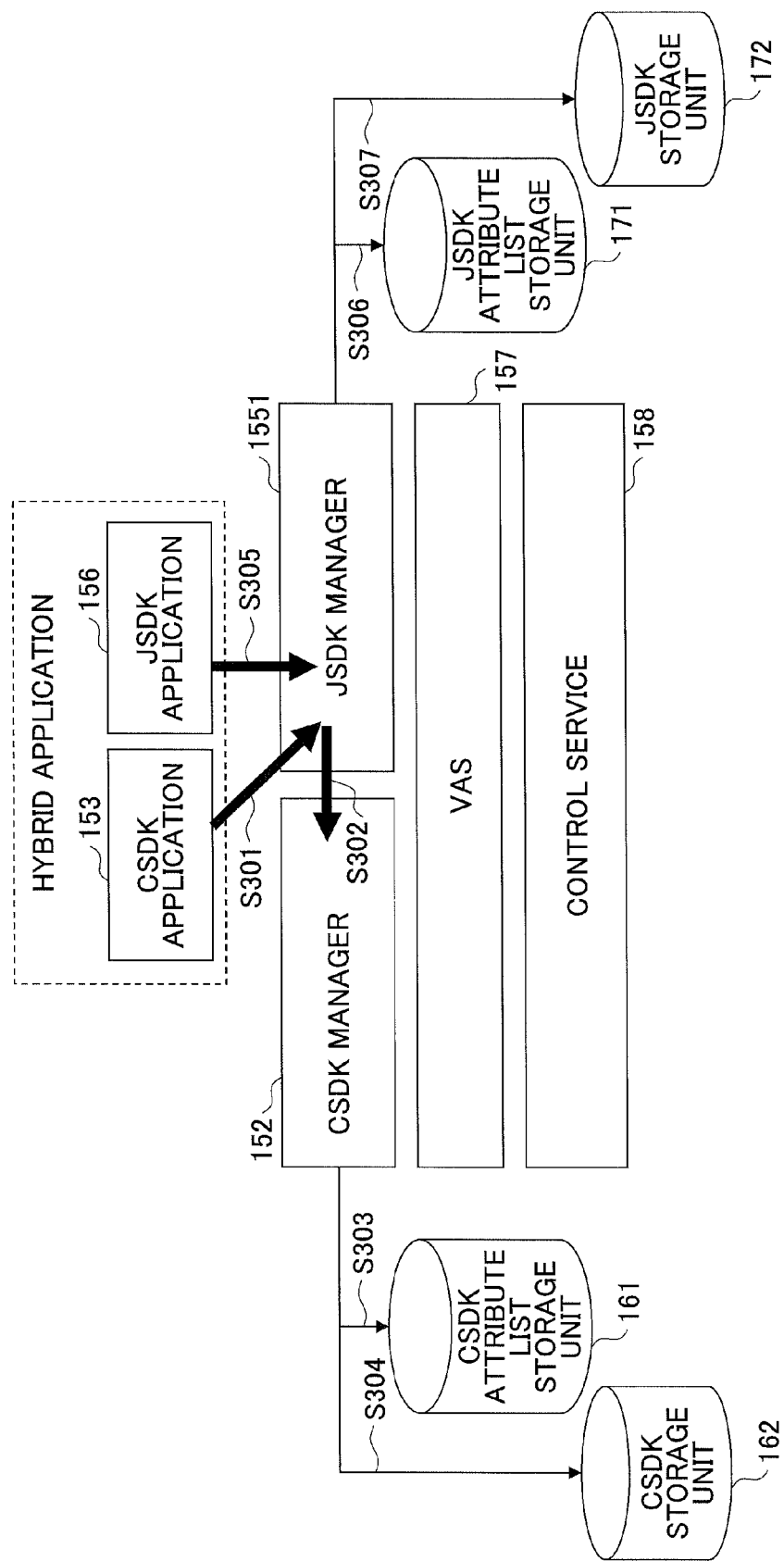
FIG. 15 is a diagram for explaining installing and uninstalling of the hybrid application in a second embodiment.

Next, a description will be given of a second embodiment, by referring to FIG. 15. FIG. 15 is a diagram for explaining installing and uninstalling of the hybrid application in the second embodiment. In FIG. 15 those parts that are the same as those corresponding parts in FIG. 9 are designated by the same reference numerals.

In the second embodiment, the JSDK manager 1551 may accept the install request to install the hybrid application, in a manner similar to the first embodiment. Hence, in the second embodiment, the user may also input one install instruction with respect to one hybrid application.

The JSDK manager 1551 may acquire the CSDK application archive file 602 included in the hybrid application archive file 600 related to the install request (step S301). The JSDK manager 1551 may specify the CSDK application archive file 602 and send the install request to install the CSDK application 153 to the CSDK manager 152 (step S302).

The CSDK manager 152 may store the attribute information and the executable file of the SDK attribute file included in the CSDK application archive file 602 in the CSDK attribute list storage unit 161 (step S303) or in the CSDK storage unit 162 (step S304).

The JSDK manager 1551 may acquire the JSDK application archive file 603 included in the hybrid application archive file 600 related to the install request (step S305). The JSDK manager 1551 may store the attribute information and the executable file of the SDK attribute file included in the JSDK application archive file 603 in the JSDK attribute list storage unit 171 (step S306) or in the JSDK storage unit 172 (step S307).

Therefore, according to the second embodiment, the load on the user to perform operations may be reduced when executing the install process to install to hybrid application or the uninstall process to uninstall the hybrid application.

In the second embodiment, with respect to the image forming apparatus 10 (image forming apparatus 10 only taking into consideration the case illustrated in FIG. 5) that does not consider the existence of the hybrid application, not only the JSDK manager 1551 but also the CSDK manager 152 may require modification. In other words, an interface may be implemented in the CSDK manager 152 of the second embodiment, in order to accept the install request from the JSDK manager 1551. In this case, the CSDK manager 152 may be stored in the ROM 113 illustrated in FIG. 2. Hence, it may be preferable not to apply the second embodiment with respect to the image forming apparatus 10 that is already on the market, distributed, or used. In other words, it may be preferable to apply the second embodiment to the image forming apparatus 10 that is to be forwarded.

On the other hand, in the first embodiment, the JSDK manager 1551 may require modification, however, the CSDK manager 152 need not be modified. In addition, the JSDK manager 1551 is included in the JSDK platform 155 that is one of the CSDK applications 153. In other words, the JSDK manager 1551 may easily be updated. Thus, when applying the first embodiment to the image forming apparatus 10 that is already on the market, distributed, or used, only the JSDK platform 155 needs to be updated so that the JSDK manager 1551 is additionally provided with the functions of installing and uninstalling the hybrid application. Therefore, the first embodiment may easily be applicable to the image forming apparatus 10 that already exists.

Although the embodiments are numbered with, for example, "first," or "second," the ordinal numbers do not imply priorities of the embodiments. Many other variations and modifications will be apparent to those skilled in the art.

Further, the present invention is not limited to these embodiments, but various variations and modifications may be made without departing from the scope of the present invention.

What is claimed is:

1. A device comprising:
  a processing unit including
    a first manager configured to store attribute information of a first program in a first storage unit, in response to an install request to install the first program; and
    a second manager configured to store attribute information of a second program in a second storage unit, in response to an install request to install the second program,
  wherein the second manager stores attribute information of a third program and attribute information of the second program included in the third program in the second storage unit, and stores attribute information of the first program included in the third program in the first storage unit, in response to an install request to install the third program that includes the first program and the second program.

2. The device as claimed in claim 1, further comprising:
  a display unit configured to display a list of programs installed in the device,
  wherein the attribute information of the third program includes identification information of the first program and identification information of the second program respectively included in the third program, and
  the first program or the second program related to the identification information included in the attribute information of the third program is excluded from a display target, based on the attribute information stored in the first storage unit and the attribute information stored in the second storage unit.

3. The device as claimed in claim 2, wherein the second manager deletes from the first storage unit the attribute information of the first program related to the identification information included in the attribute information of the third program, and deletes from the second storage unit the attribute information of the third program and the attribute information of the second program related to the identification information included in the attribute information of the third program, in response to an uninstall request to uninstall the third program selected from the list.

4. The device as claimed in claim 1, wherein a program installed in the device as the first program causes the device to function as the second manager.

5. The device as claimed in claim 2, wherein a program installed in the device as the first program causes the device to function as the second manager.

6. The device as claimed in claim 3, wherein a program installed in the device as the first program causes the device to function as the second manager.

7. An information processing method comprising:
  a first managing procedure causing a computer to store attribute information of a first program in a first storage unit, in response to an install request to install the first program; and
  a second managing procedure causing the computer to store attribute information of a second program in a second storage unit, in response to an install request to install the second program,
  wherein the second managing procedure causes the computer to store attribute information of a third program and attribute information of the second program included in the third program in the second storage unit, and store attribute information of the first program included in the third program in the first storage unit, in response to an install request to install the third program that includes the first program and the second program.

8. The information processing method as claimed in claim 7, further comprising:

a display procedure causing the computer to display a list of programs installed in the device on a display unit, wherein the attribute information of the third program includes identification information of the first program and identification information of the second program respectively included in the third program, and the first program or the second program related to the identification information included in the attribute information of the third program is excluded from a display target, based on the attribute information stored in the first storage unit and the attribute information stored in the second storage unit.

9. The information processing method as claimed in claim 8, wherein the second managing procedure causes the computer to delete from the first storage unit the attribute information of the first program related to the identification information included in the attribute information of the third program, and delete from the second storage unit the attribute information of the third program and the attribute information of the second program related to the identification information included in the attribute information of the third program, in response to an uninstall request to uninstall the third program selected from the list.

10. The information processing method as claimed in claim 7, wherein a program installed in the computer as the first program causes the computer to function as the second manager.

11. A non-transitory computer-readable storage medium storing a program which, when executed by a computer, causes the computer to perform a process comprising:

a first managing procedure to store attribute information of a first program in a first storage unit, in response to an install request to install the first program; and a second managing procedure to store attribute information of a second program in a second storage unit, in response to an install request to install the second program, wherein the second managing procedure stores attribute information of a third program and attribute information of the second program included in the third program in the second storage unit, and stores attribute information of the first program included in the third program in the first storage unit, in response to an install request to install the third program that includes the first program and the second program.

12. The non-transitory computer-readable storage medium as claimed in claim 11, wherein the process further comprises:

a display procedure to display a list of programs installed in the device on a display unit, wherein the attribute information of the third program includes identification information of the first program and identification information of the second program respectively included in the third program, and the first program or the second program related to the identification information included in the attribute information of the third program is excluded from a display target, based on the attribute information stored in the first storage unit and the attribute information stored in the second storage unit.

13. The non-transitory computer-readable storage medium as claimed in claim 12, wherein the second managing procedure deletes from the first storage unit the attribute information of the first program related to the identification information included in the attribute information of the third program, and deletes from the second storage unit the attribute information of the third program and the attribute information of the second program related to the identification information included in the attribute information of the third program, in response to an uninstall request to uninstall the third program selected from the list.

14. The non-transitory computer-readable storage medium as claimed in claim 11, wherein a program installed in the computer as the first program causes the computer to function as the second manager.

* * * * *